US006028854A

United States Patent [19]

Raith et al.

[11] Patent Number: 6,028,854

[45] Date of Patent: Feb. 22, 2000

[54] RADIOCOMMUNICATION SYSTEMS AND TERMINALS WITH INCREASED PAYLOAD BANDWIDTH

[75] Inventors: Alex Krister Raith, Durham; James Ragsdale, Raleigh; John Diachina, Garner, all of N.C.

[73] Assignee: Telefonaktiebolaget LM Ericsson, Stockholm, Sweden

[21] Appl. No.: 08/730,360

[22] Filed: Oct. 15, 1996

[51] Int. Cl.[7] ...... H04J 3/16

[52] U.S. Cl. ...... 370/347; 370/321; 370/337; 370/458

[58] Field of Search ...... 370/347, 320, 370/321, 324, 328, 335, 336, 337, 342, 345, 350, 338, 331, 330, 394, 389, 458; 455/422, 440

[56] References Cited

U.S. PATENT DOCUMENTS

| | | | |
|---|---|---|---|
| 4,058,672 | 11/1977 | Crager et al. | 370/394 |
| 5,111,454 | 5/1992 | Hung et al. | 370/347 |
| 5,182,753 | 1/1993 | Dahlin et al. | 371/43 |
| 5,241,545 | 8/1993 | Kazecki et al. | 370/106 |
| 5,299,235 | 3/1994 | Larsson et al. | 370/350 |
| 5,481,539 | 1/1996 | Hershey et al. | 370/337 |
| 5,541,978 | 7/1996 | Brunner et al. | 370/336 |
| 5,606,548 | 2/1997 | Vayrynen et al. | 370/337 |
| 5,732,076 | 3/1998 | Ketseoglou et al. | 370/347 |
| 5,757,789 | 5/1998 | Dent | 370/337 |
| 5,839,071 | 11/1998 | Johnson | 455/440 |

FOREIGN PATENT DOCUMENTS

| | | | |
|---|---|---|---|
| 522631 | 1/1993 | European Pat. Off. | H04Q 7/02 |
| 605312 | 7/1994 | European Pat. Off. | H04B 7/26 |
| 642233 | 3/1995 | European Pat. Off. | H04B 7/26 |
| WO96/21998 | 7/1996 | WIPO . | |

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

Variances in bandwidth used by a radiocommunication connection are adapted to by changing the type of information being transmitted. For example, in a TDMA environment, a first downlink time slot associated with a double- or triple-rate connection may have a first format, while a second time slot associated with the same connection may have a second format different from the first format. Additional bits in the second (or third) time slot can be used to carry payload information which is not required to be transmitted at greater than full-rate. Moreover, FACCH information need only be transmitted in the master channel.

31 Claims, 4 Drawing Sheets

| | | | | | | |
|---|---|---|---|---|---|---|
| SLOT 1 | SYNC | SACCH | DATA | CDVCC | DATA | CDL |
| SLOT 2 | SYNC | DATA | | | | |
| SLOT 3 | SYNC | DATA | | | | |

FIG. 4
| SLOT 1 | SLOT 2 | SLOT 3 | SLOT 4 | SLOT 5 | SLOT 6 |
|---|---|---|---|---|---|
FIG. 5A
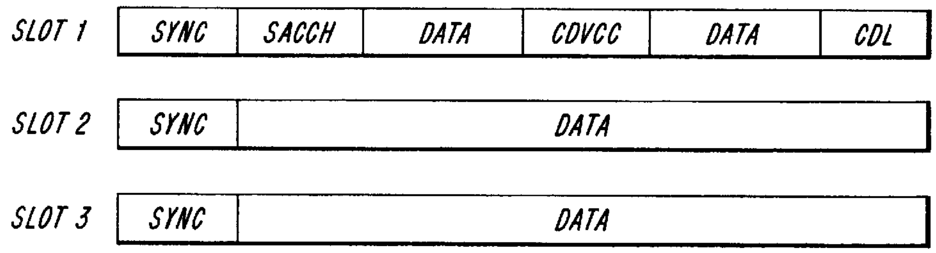
FIG. 5B
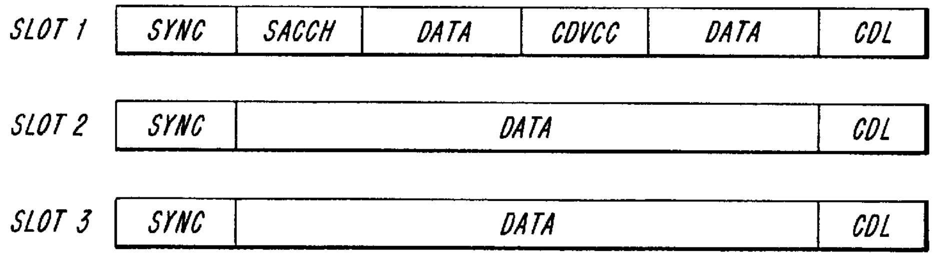
FIG. 5C
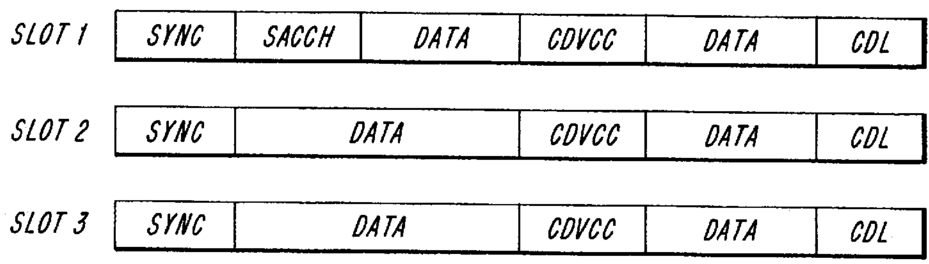

FIG. 6A

| SLOT 1 | DATA | SYNC | DATA | SACCH | CDVCC | DATA |
|---|---|---|---|---|---|---|
| SLOT 2 | DATA | SYNC | DATA | | | |
| SLOT 3 | DATA | SYNC | DATA | | | |

FIG. 6B

| SLOT 2/3 | DATA | SYNC | DATA | CDVCC | DATA |
|---|---|---|---|---|---|

RADIOCOMMUNICATION SYSTEMS AND TERMINALS WITH INCREASED PAYLOAD BANDWIDTH

RELATED APPLICATION

This application is related to U.S. patent application Ser. No. 08/725,643, entitled "Multi-Rate Radiocommunication Systems and Terminals", which application was filed on the same date as this application.

BACKGROUND

Applicant's invention relates generally to radiocommunication systems, e.g., cellular or satellite systems, that use digital traffic channels in a multiple access scheme, e.g., time division multiple access (TDMA) or code division multiple access (CDMA).

The growth of commercial radiocommunications and, in particular, the explosive growth of cellular radiotelephone systems have compelled system designers to search for ways to increase system capacity without reducing communication quality beyond consumer tolerance thresholds. One way to increase capacity is to use digital communication and multiple access techniques such as TDMA, in which several users are assigned respective time slots on a single radio carrier frequency.

In North America, these features are currently provided by a digital cellular radiotelephone system called the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVC) and TDMA digital traffic channels (DTC), and the system operator can dynamically replace one type with the other to accommodate fluctuating traffic patterns among analog and digital users. The AVCs and DTCs are implemented by frequency modulating radio carrier signals, which have frequencies near 800 megahertz (Mhz) such that each radio channel has a spectral width of 30 kilohertz (Khz). A subsequent standard, referred to as IS-136, adds specifications for digital control channels. This standard document, in particular the version identified as PN-3474.1, dated Dec. 15, 1995 and published by EIA/TIA, is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six traffic channels (e.g., one to six radio connections). The number of connections which can be supported by each TDMA frame depends on the desired information transmission rate. For example, if the connections are used to support the transmission of voice information, the number of slots used per channel depends on the source rates of the speech coder/decoders (codecs) used to digitally encode the conversations. Such speech codecs can operate at either full-rate or half-rate, with full-rate codecs being expected to be used until half-rate codecs that produce acceptable speech quality are developed.

Thus, a full-rate DTC requires twice as many time slots in a given time period as a half-rate DTC, and in IS-54B, each radio channel can carry up to three full-rate DTCs or up to six half-rate DTCs. Each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

In addition to voice information being transmitted on the traffic channels, various other types of data can and will be transmitted thereon. For example, facsimile (fax) transmissions are commonly supported by radiocommunication systems. Similarly, packet data transmissions, which divide information streams into packets rather than providing dedicated (i.e., "connection-oriented") channels for each information stream, will be supported in radiocommunication systems. Other types of information transmission, e.g., video or hybrid voice, data and video to support internet connections, will likely be supported in the future.

These various types of information communication (also referred to herein as different "services") will likely have different optimal transmission characteristics. For example, services between a remote user and the internet may benefit by providing a greater bandwidth in the downlink (i.e., from the internet to the remote station) than in the uplink, since many users spend a significant portion of their connection time downloading information from the internet rather than uploading thereto. Thus, it may be desirable in such cases to allocate a triple rate connection in the downlink (e.g., all six time slots of an IS-136 TDMA frame) but only a full rate connection in the uplink (e.g., two time slots of an IS-136 frame). Alternatively, if a mobile station is used to transmit data, e.g., a fax, it may be desirable to provide more bandwidth in the uplink than in the downlink. This inequality between uplink and downlink bandwidth is referred to herein as an "asymmetrical" connection.

Accordingly, it would be desirable to provide techniques for transmitting information between remote stations and the system in radiocommunication networks that provide sufficient flexibility for the anticipated variety of information communication services described above, while also providing sufficient compatibility with existing technology so that equipment used by the existing consumer base will not become obsolete.

SUMMARY

According to exemplary embodiments of the present invention, the type of information transmitted in the uplink or downlink may vary depending upon the transmission rate. For example, in a TDMA environment, a first downlink time slot associated with a double- or triple-rate connection may have a first format, while a second time slot associated with the same connection may have a second format different from the first format. The different formats take into account the need to transmit certain types of information at only full-rate, and not double- or triple-rate. For example, the field which conventionally carries slow associated control channel (SACCH) information may need only to be transmitted at full rate. Thus, for double- or triple-rate connections, the SACCH field can instead be used to transmit additional payload data in some of the downlink or uplink traffic channel slots.

Applicants have also recognized that fast associated control channel (FACCH) information also need only be transmitted at full-rate. Unlike SACCH, however, FACCH information does not have its own dedicated field in each time slot. Instead, FACCH is time multiplexed with payload information in the DATA field(s). Thus, according to other exemplary embodiments of the present invention, some time slots associated with double- or triple-rate connections may not carry any FACCH information. This simplifies processing techniques which typically require discriminating between FACCH and payload transmissions, since the receiving equipment will know that certain time slots associated with a particular connection will only carry payload information.

BRIEF DESCRIPTION OF THE DRAWINGS

The features and advantages of Applicants' invention will be understood by reading this description in conjunction with the drawings, in which:

FIG. 4 illustrates triple-rate downlink frame usage;

FIGS. 5A–5C illustrate various downlink traffic channel time slot formats according to exemplary embodiments of the present invention; and FIGS. 6A and 6B illustrate various uplink traffic channel time slot formats according to exemplary embodiments of the present invention.

DETAILED DESCRIPTION

The following description is scripted in terms of a cellular radiotelephone system, but it will be understood that Applicant's invention is not limited to that environment. Also, the following description is in the context of TDMA cellular communication systems, but it will be understood by those skilled in the art that the present invention may apply to hybrid access methodologies, e.g,. those including TDMA and Code Division Multiple Access (CDMA).

Figure 1:
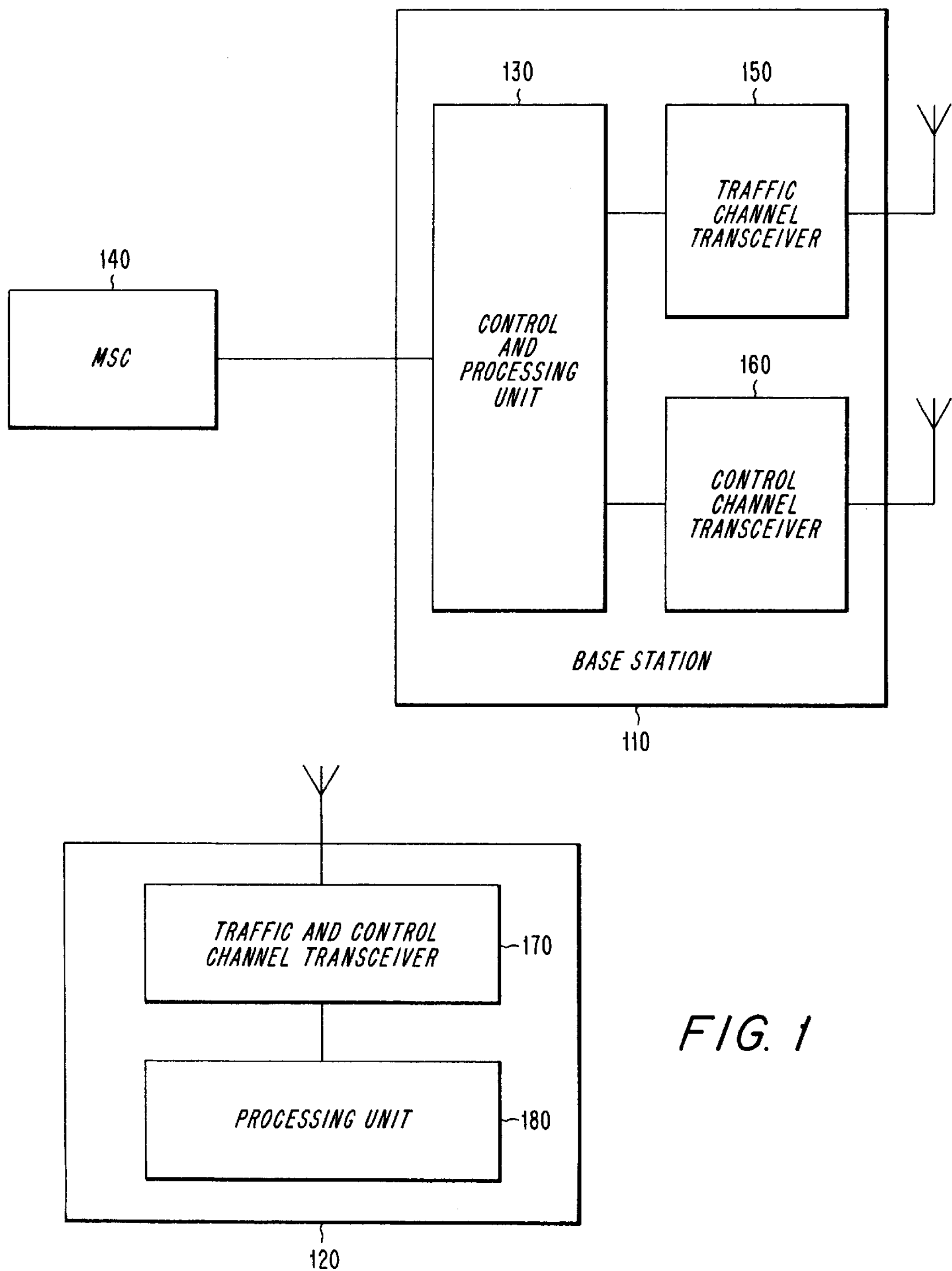
FIG. 1 is a block diagram of an exemplary cellular radio telephone system in which the present invention may be applied.

FIG. 1 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile station 120 has located a control channel, e.g., by using digital control channel location information found on a traffic channel, it can then read the control information transmitted on that control channel, e.g., paging messages, using its traffic and control channel transceiver 170. Then, the processing unit 180 evaluates the received control channel information, which may include, for example, paging messages or requests to measure signals strengths on identified channels. When a connection between the mobile station 120 and the system is desired, the transceiver 170 will tune to an appropriate traffic channel as described below.

Figure 2:
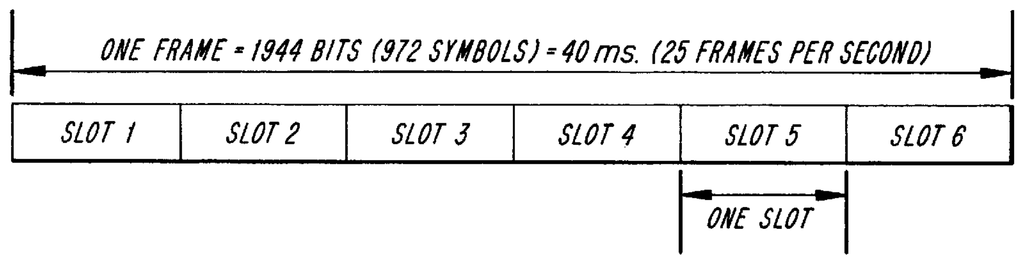
FIG. 2 illustrates an exemplary TDMA frame structure.

An exemplary organization of the information transmitted on each radio channel, i.e., the channel bursts, or time slots, in accordance with Applicant's invention is shown in FIG. 2. The consecutive time slots on a radio channel are organized in TDMA frames of, for example, six slots each so that a plurality of distinct channels can be supported by a single radio carrier frequency. Each TDMA frame in this example has a duration of 40 msec and supports six half-rate logical channels, three full-rate logical channels, or greater bandwidth channels as indicated in the following table. Each slot can, for example, have a duration of 6.67 msec and carry 324 bits (162 symbols), which have positions in each slot that are conventionally consecutively numbered 1–324.

| Number of Slots | Used Slots | Rate |
|---|---|---|
| 1 | 1 | half |
| 2 | 1,4 | full |
| 4 | 1,4,2,5 | double |
| 6 | 1,4,2,5,3,6 | triple |

Figure 3A:
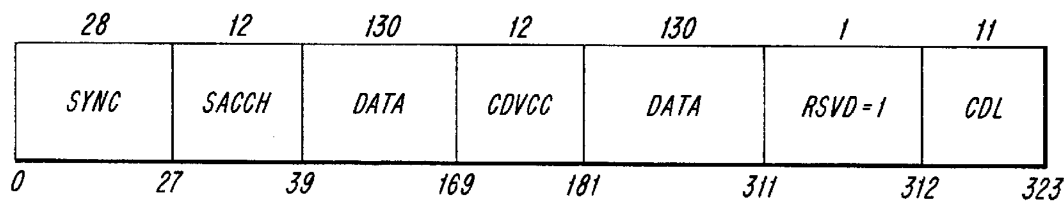
FIG. 3A illustrates a conventional downlink traffic channel time slot format.

Currently, IS-136 defines a downlink DTC slot format as illustrated in FIG. 3A. Therein, the numbers above each field denote the number of bits associated therewith. For example, the SYNC field is used for synchronization equalizer training and time slot identification. The SACCH (Slow Associated Control Channel) is a continuous signalling channel used, for example, for transmission of control and supervision messages between the mobile station and the base station. The two DATA fields are used to transmit the "payload" of the slot, e.g., user information or control channel information as part of the FACCH (Fast Associated Control Channel). The CDVCC (Coded Digital Verification Color Code) is a cell identifier that identifies the base station which is transmitting to the mobile station. The CDL (Coded Digital Control Channel Locator) is a pointer which can be used to indicate on which frequency, or set of frequencies, a digital control channel is likely to be found. For extensive information relating to the CDL and mobile functionality relating to locating digital traffic channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference.

Figure 3B:
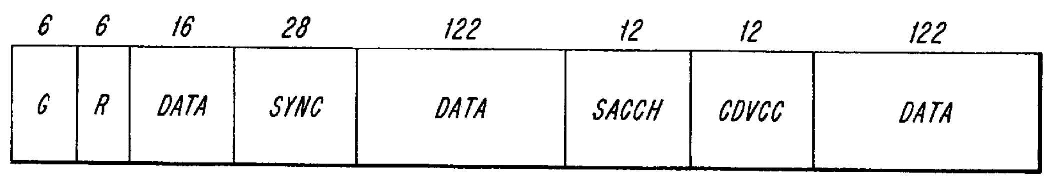
FIG. 3B illustrates a conventional uplink traffic channel time slot format.

FIG. 3B illustrates a conventional uplink traffic channel format as currently specified by IS-136. Therein, the bit sizes of each field are specified by the numbers above each field. Similarly identified fields, including DATA, SYNC, CDVCC, and SACCH, are used in the manner described above with respect to the conventional downlink traffic channel format of FIG. 3A. Guard time field (G) and ramp time field (R) are provided to provide the base station some time between received time slots from different mobiles and to avoid spectral splatter. Unlike the downlink, the uplink has no CDL field since the base station has no need of such information.

Another conventional aspect regarding the digital traffic channel format illustrated in FIGS. 3A and 3B, is the periodic usage of the payload, i.e., DATA fields, for the purposes of sending fast associated control channel (FACCH) information. Unlike the SACCH, which is a continuous control channel, the FACCH operates in a blank and burst mode such that it periodically replaces the "normal" traffic channel payload, e.g., speech frames. Thus, the FACCH provides a mechanism for sending a relatively large number of control information bits in a single burst, as compared with the 12-bit SACCH.

Conventionally, the downlink and uplink formats of FIGS. 3A and 3B are used for each time slot in a respective downlink or uplink TDMA frame, i.e., all six time slots for systems operating according to IS-136. According to the present invention, however, it may be desirable to provide alternative slot formats to accommodate the different communication situations described above. Consider again the situation where it is desirable to provide a triple rate connection in either the downlink (i.e., base-to-mobile direction) or the uplink (i.e., mobile-to-base direction). This situation is shown in FIG. 4. Therein, a frame is illustrated wherein all six time slots are allocated to a particular link between a mobile and a base station, as denoted by the cross-hatching of each of time slots 1–6.

Since the mobile station is using a triple-rate connection, this implies that it is reading or transmitting in the data fields of each of the time slots 1–6 in FIG. 4. However, some of the other fields provided in the conventional downlink or uplink time slot formats of FIGS. 3A and 3B need not be transmitted in each time slot under these circumstances. For example, the type of overhead signalling that occurs on the SACCH is such that the mobile station or the base station need not receive the SACCH at triple rate, i.e., full-rate SACCH supplies ample signalling capacity. That is, the recipient of the triple-rate connection may only need to receive one SACCH burst every three time slots. Thus the field that is normally used for SACCH information in slots 2 and 3 (as well as slots 5 and 6) can be replaced by payload information according to the present invention.

Similarly, the CDVCC field includes information that aids in the identification of the radio link and is conventionally used for radio link control, e.g., tearing down of a connection. However, this information can be provided to the mobile station over the control channel at call-setup and, accordingly, need not be transmitted by the base station in each downlink time slot nor by the mobile station in each uplink time slot. Similarly, the CDL field can be omitted in some downlink time slots, although various techniques are described below to avoid difficulties caused thereby.

Recognizing that some conventional information may periodically be omitted in these situations, and bandwidth being a precious commodity, exemplary embodiments of the present invention provide techniques for adjusting the slot format to utilize bandwidth more efficiently when double- or triple-rate connections are allocated either in the uplink or the downlink. A first example is provided in FIG. 5A. Therein, three downlink slot formats are illustrated for an exemplary triple-rate traffic channel according to the present invention. These three slot formats might correspond, for example, to slots 1, 2 and 3 of FIG. 4. Slots 4, 5 and 6 would have the same format as slots 1, 2 and 3, respectively for this exemplary embodiment. Unlike conventional systems, e.g., those currently specified by IS-136, the downlink formats illustrated in FIG. 5 differ within the frame. Specifically, while time slot 1 has the same slot format as conventional downlink traffic time slots (see, e.g., FIG. 3A), time slots 2 and 3 differ in that the SACCH, CDVCC and CDL fields of slot 1 have each been replaced by a DATA field, which results in one large DATA field following the SYNC field in slots 2 and 3.

The exemplary embodiment of FIG. 5A maximizes the bandwidth associated with the payloads on the downlink, triple-rate channel. However, it may be desirable, for example, to maintain the CDL or both the CDVCC and the CDL for compatibility purposes. These exemplary embodiments are illustrated in FIGS. 5B and 5C, respectively. Those skilled in the art will appreciate that if the mobile station is receiving at double-rate, that an additional full-rate channel is then available for another mobile station's usage, which channel would then employ the conventional downlink time slot format.

Figures 6A, 6B:
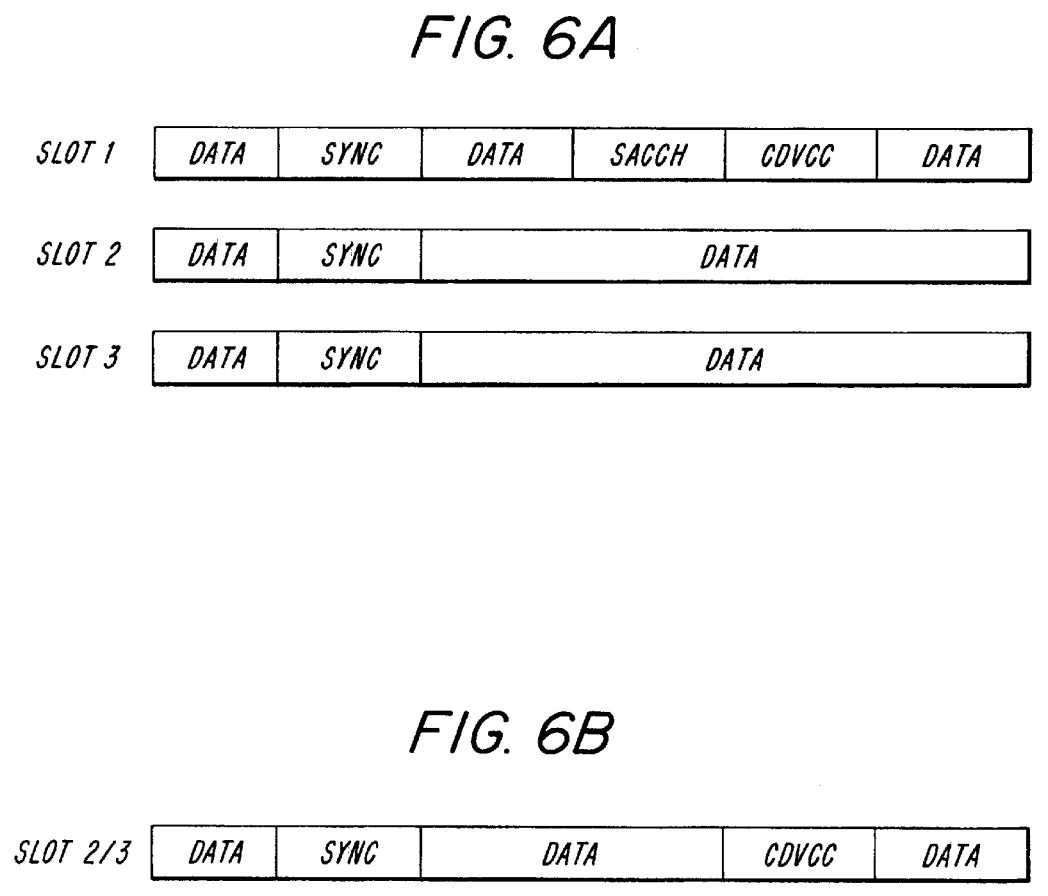

Similar changes can be made in the uplink traffic channel format if the mobile station is transmitting at double- or triple rate. For example, in FIG. 6A, a triple-rate uplink format is illustrated wherein the SACCH and CDVCC fields have been filled with payload information. If it is desirable to maintain the CDVCC information, then the slot 2 and/or slot 3 format could instead be as illustrated in FIG. 6B. Those skilled in the art will appreciate that if the mobile station is transmitting at double-rate, then the remaining full-rate channel would have the same format as shown for slot 1 for each of the embodiments of FIGS. 6A and 6B.

These exemplary embodiments of the present invention provide several advantages. First, an increase in bit rate is achievable. Additionally a reduction in processing complexity can be realized by not requiring the transmitting equipment (base or mobile) to encode, e.g., the SACCH, six times per frame and not requiring the receiving equipment (mobile or base) to decode same six time per frame (for triple-rate).

As mentioned above, exemplary embodiments of the present invention wherein the base station only transmits the CDVCC and/or the CDL in some slots of a downlink traffic channel may cause difficulties for other mobile stations that expect this information in all time slots on a downlink traffic channel. For extensive information relating to the CDL and mobile functionality relating to locating digital traffic channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. In brief, the CDL field is used by unconnected mobile stations (e.g., at power-up) to locate a control channel if the first channel to which it tunes is a traffic channel. According to one exemplary technique, a mobile station reads the field corresponding to the CDVCC in the time slot to which it first tunes on a frequency. This conventional mobile station will identify this field as either a CDVCC (implying a traffic channel per the format of FIG.

3) or a coded superframe phase (CSFP) (implying a control channel per IS-136). If a traffic channel, the mobile station will then use the CDL information as a pointer to search another channel number, or set of channel numbers, for a control channel.

Thus, if the CDVCC information is replaced by payload data on some downlink time slots, a conventional mobile station, i.e., one which is unaware of the location of valid CDVCC information, reading this field for the purpose of identifying the channel as either a control channel or a traffic channel may misidentify a traffic channel as a control channel. Alternatively, the mobile station might read the payload data as valid CDVCC data (thus correctly identifying the channel as a traffic channel) and then look for the CDL, which is not present (thus moving to an incorrect channel number or set to search).

Both of these problems can be avoided according to exemplary embodiments of the present invention by recognizing that both the CSFP and the CDVCC according to IS-136 are (12,8) encoded data words, i.e., 8 bits of data encoded to 12 bits that have particular characteristics. Specifically, the CDVCC is a (12,8) code word that remains the same in each time slot associated with a particular channel and has non-inverted checkbits, while the CSFP is a (12,8) code word that has inverted checkbits and acts as an upcounter. Since the universe of (12,8) codewords having these characteristics is relatively small as compared with the number of total number of 12 bit binary words, the payload data information disposed in the bit locations typically used by either the CSFP or the CDVCC can be made distinct from the CDVCC and CSFP to avoid confusion. Specifically, the base station can transmit payload information in this portion of, for example, slot 2, which is carefullly tailored to avoid similarity with a (12,8) codeword having these characteristics by adding filler bits to distinguish therefrom as will be readily appreciated by those skilled in the art. The receiving equipment will then treat these filler bits as reserved bits or simply discard them as lacking any information content.

Of course, those mobile stations (or other receiving equipment) which are designed with the present invention in mind will be aware that the SACCH, CDVCC and CDL information can be located at a pre-defined full-rate portion of a multi-rate channel, which pre-defined portion is referred to herein as the "master channel". The master channel may, as in the afore-described examples, be transmitted on time slots 1 and 4, or alternatively on time slots 2 and 5 or 3 and 6. In any case, a mobile station which has been suitably programmed to be aware of master channels can simply tune to a master channel to find CDL information.

According to another exemplary embodiment of the present invention, Applicants have recognized that FACCH signalling capacity also need not be provided at double- or triple-rate. Thus, it can be specified that those time slots other than the master timeslots will not carry FACCH information thereon. This further reduces complexity, since the equipment need not discriminate between payload data and FACCH information as was previously required for all time slots.

It is, of course, possible to embody the invention in specific forms other than those described above without departing from the spirit of the invention. The embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for transmitting information on a traffic channel between a remote station and a base station in a radiocommuniication system comprising the steps of:

grouping the information into a plurality of successive time slots on a radio carrier signal;

grouping a plurality of said successive time slots into a frame;

providing at least one payload data field within each of said successive time slots;

providing a first field starting at a first predetermined bit position in at least one of said successive time slots within said frame, said first field containing a first type of information;

providing a second field starting at said first predetermined bit position in at least another one of said successive time slots within said frame, said second field containing a second type of information different than said first type of information; and transmitting said frame.

2. The method of claim 1, wherein said first type of information is slow associated control channel information.

3. The method of claim 1, wherein said first type of information is coded digital verification color code information.

4. The method of claim 1, wherein said first type of information is coded digital control channel locator information.

5. The method of claim 2, wherein said fit predetermined bit position is bit number 27 in a 324 bit time slot.

6. The method of claim 3, wherein said first predetermined bit position is bit number 169 in a 324 bit time slot.

7. The method of claim 4, wherein said first predetermined bit position is bit number 312 in a 324 bit time slot.

8. The method of claim 2, wherein said first predetermined bit position is a next bit after a synchronization field.

9. The method of claim 3, wherein said first predetermined bit position is a next bit after a data field.

10. The method of claim 4, wherein said firs predetermined bit position is a next bit after a data field.

11. The method of claim 1, wherein said second type of information is additional payload data.

12. The method of claim 1, wherein said at least one of said successive time slots within said frame is a first time slot.

13. A method for transmitting information between a communication terminal and a radiocommnunication system at greater than full-rate comprising the steps of:

transmitting slow associated control channel information in a field of a first time slot in a frame; and transmitting information other than slow associated control channel information in said field in another time slot in said frame.

14. A method for transmitting information between a communication terminal and a radiocommunication system at greater than full-rate comprising the steps of:

transmitting coded digital verification color code information in a field of a first time slot in a frame; and transmitting information other than said coded digital verification color code information in said field in another time slot in said frame.

15. The method of claim 14, wherein said coded digital verification color code information is used by said system to identify a radio link between said communication terminal and said radiocommunication system.

16. A method for transmitting information between a communication terminal and a radiocommunication system at greater than full-rate comprising the steps of:

transmitting coded digital control channel locator information in a field of a first time slot in a frame; and transmitting information other than said coded digital control channel locator information in said field in another time slot in said frame.

17. The method of claim 16, wherein said coded digital control channel locator information is used by communication terminals to locate a digital control channel.

18. A method for transmitting information between a communication terminal and a radiocommunication system at a rate greater than full-rate comprising the steps of:

transmitting fast associated control channel information between said communication terminal and said radiocommunication system at full-rate; and transmitting payload information at said rate greater than full-rate.

19. The method of claim 18, wherein fill-rate comprises two out of six time slots in a frame.

20. The method of claim 18, wherein said rate greater than full rate is double-rate.

21. The method of claim 18, wherein said rate greater than full rate is triple-rate.

22. A method for transmitting fast associated control channel information on a traffic channel in a radiocommunication system comprising the steps of:

providing a plurality of time slots associated with a carrier frequency;

time multiplexing said fast associated control channel information with other information on at least one of said plurality of time slots;

omitting said fast associated control channel information from time slots other than said at least one of said plurality of time slots; and transmitting said plurality of time slots on said carrier frequency.

23. The method of claim 22, wherein said step of time multiplexing further comprises the step of:

time multiplexing said fast associated control channel information on a first slot and a fourth time slot in a six successive time slot frame.

24. The method of claim 22, wherein said step of time multiplexing further comprises the step of:

time multiplexing said fast associated control channel information on a second slot and a fifth time slot in a six successive time slot frame.

25. The method of claim 22, wherein said step of time multiplexing further comprises the step of:

time multiplexing said fast associated control channel information on a third slot and a sixth time slot in a six successive time slot frame.

26. A mobile station comprising:

a receiver for receiving information; and a processor for processing information in a predetermined field according to a first technique when said predetermined field is part of information received in a first time slot and according to a second technique when said predetermined field is part of information received in a second time slot.

27. The mobile station of claim 26, wherein said first technique is to process said information as slow associated control channel information when in said first time slot and said second technique is to process said information as non-slow associated control channel information when in said second time slot.

28. The mobile station of claim 26, wherein said first technique is to discriminate whether said information is fast associated control channel information or payload information when in said first time slot and said second technique is to process said received information as non-fast associated control channel information when in said second time slot.

29. A base station comprising:

a processor for allocating information to fields associated with time slots, wherein said processor allocates a first type of information to a predetermined field within a first time slot and a second type of information to said same predetermined field within a second time slot; and a transmitter for transmitting said first type of information in said first time slot and said second type of information in said second time slot.

30. The base station of claim 29, wherein said first type of information is slow associated control channel information and said second type of information is non-slow associated control channel information.

31. The base station of claim 29, wherein said first type of information is time multiplexed fast associated control channel information and payload information and said second type of information is non-fast associated control channel information.

* * * * *